United States Patent [19]

Kutcher

[11] 4,449,053

[45] May 15, 1984

[54] VERTICAL AXIS WIND TURBINE

[75] Inventor: Howard R. Kutcher, Allison Park, Pa.

[73] Assignee: Aluminum Company of America, Pittsburgh, Pa.

[21] Appl. No.: 287,028

[22] Filed: Jul. 27, 1981

[51] Int. Cl.³ .................. F01D 5/14; F03D 7/04; H02J 3/08

[52] U.S. Cl. .................. 290/44; 290/55; 416/227 A; 416/132 B

[58] Field of Search ............... 290/44, 55; 416/227 A, 416/142 B, 132 B, 142, 174; 52/114, 116, 120; 403/27, 43–48, 217–219, 306, 408; 184/65

[56] References Cited

U.S. PATENT DOCUMENTS

| | | | |
|---|---|---|---|
| 1,006,950 | 10/1911 | Keddy | 403/43 X |
| 1,642,979 | 9/1927 | Timbs et al. | 308/187 |
| 1,676,894 | 7/1928 | Frank | 308/187 |
| 1,835,018 | 12/1981 | Darrieus | 415/212 R |
| 2,634,177 | 4/1953 | Guibert | 308/230 |
| 3,140,850 | 7/1964 | Packard | 403/43 X |
| 3,719,377 | 3/1973 | Schultz et al. | 403/44 |
| 4,163,347 | 8/1979 | Marcmann | 403/27 X |
| 4,168,439 | 9/1979 | Palma | 290/55 X |
| 4,281,965 | 8/1981 | Stjernholm | 416/227 A |
| 4,364,710 | 12/1982 | Campbell | 416/142 B |
| 4,366,387 | 12/1982 | Carter, Jr. et al. | 416/132 B X |

FOREIGN PATENT DOCUMENTS 389331 5/1971 U.S.S.R.

OTHER PUBLICATIONS

S9114; Development of 1 Kw Vertical Axis Wind Generator; Conference entitled: "Sun: Mankind's Future Source of Energy;" New Delhi, India; Jan. 1978; R. P. Gupta and S. K. Chandra.

S9076; Torque Ripple in a Vertical Axis Wind Turbine; Conference entitled: "Proceedings of the 13th Intersociety Energy conversion Engineering Conference;" San Diego, CA, USA; 1978; R. C. Reuter, Jr. and M. H. Worstell.

*The Vertical Axis Wind Turbine "How It Works"*, SLA–74–0160, Dec. 1974, by B. F. Blackwell, Sandia Laboratories.

*Design and Fabrication of a Low Cost Darrieus Vertical Axis Wind Turbine System Phase 1*, Final Report by Aluminum Company of America to Department of Energy under U.S. Government Contract #EM-78-C-04-4272, Jun. 22, 1979.

*Primary Examiner*—J. V. Truhe
*Assistant Examiner*—Terry Flower
*Attorney, Agent, or Firm*—Max L. Williamson

[57] ABSTRACT

A Darrieus-type vertical axis wind turbine is disclosed which includes a vertically extending rotor tube mounted on a support structure with two or three rotor blades of troposkein configuration on the rotor tube for rotating the tube in response to wind energy and thereby drive a generator to produce electrical power. The turbine includes an erection hinge which permits assembly of the rotor tube and blades at close to ground level followed by upward hinging of the rotor assembly to a vertical position. It also includes a system for automatically lubricating the top bearing upon erection and a system for visually tensioning the guy cables.

17 Claims, 16 Drawing Figures

TO CRANE LIFTING ATTACHMENT

VERTICAL AXIS WIND TURBINE

BACKGROUND OF THE INVENTION

1. Field of Art

This invention relates to vertical axis wind turbines.

2. Brief Description of the Prior Art

The Darrieus-type vertical axis wind turbine (VAWT) having its rotating shaft transverse to the air flow was patented by G. J. M. Darrieus in the United States in 1931 (U.S. Pat. No. 1,835,018). The Darrieus-type vertical axis wind turbine is said to resemble an eggbeater with curved blades connected at both ends to the ends of the rotating shaft. Each blade of the turbine is a symmetric airfoil in cross section and is curved in the shape that a perfectly flexible cable of uniform density and cross section would assume if spun about a vertical axis. The shape of the blade is represented by the Greek word "troposkein" meaning turning rope. With blades having a troposkein configuration, major stresses are in tension when the rotor is spinning. Thus, rotation of the turbine will not cause the blades to bend nor produce bending stresses in the blades.

The operational principle of the vertical axis wind turbine (VAWT) is analogous to the aerodynamics of a wing (airfoil) as is described in a paper entitled *The Vertical Axis Wind Turbine "How it Works"*, SLA-74-0160, December 1974 by B. F. Blackwell of Sandia Laboratories, Albuquerque, New Mexico. Fluid forces on the airfoil in a VAWT are divided into lift and drag forces with a component of the lift force causing rotation and a component of the drag force opposing rotation. The driving torque will be positive as long as the driving component of the lift force exceeds the opposing component of the drag force. With such a system, the aerodynamic performance is poor at low wind speeds and the blades may stall at low rotational speeds. Consequently, some type of auxiliary device such as a motor must usually be employed to start the system.

Although the Darrieus-type VAWT has been around for over fifty years, it has received little attention until the last two decades. In the 1960's, the National Research Council of Canada initiated a program to further develop and demonstrate Darrieus-type VAWTs, and their efforts have led to the installation of over two dozen turbines, including several in the United States. In 1973, Sandia Laboratories in Albuquerque, New Mexico began efforts to perfect VAWTs and two research machines are now in operation at Sandia's test site. Sandia's efforts are directed and funded by the United States Department of Energy through its Albuquerque Operations Office.

Interest in Darrieus-type vertical axis wind turbines has been stimulated in recent years by the energy crisis and by the recognition of the important advantages of such turbines which include: (1) the turbine accepts wind from all directions and therefore doesn't require costly direction orienting equipment, (2) the turbine doesn't require adjustment of pitch of the blades to limit maximum output at high wind speeds, (3) the generator and other working parts of the turbine are at ground level thereby obviating any need for a costly support tower, and (4) the blades of the turbine are stressed primarily in tension and therefore are lighter and less expensive.

Despite the advancements that have been made in the design of VAWTs in the last two decades and the inherent advantages of VAWTs, a VAWT is desired which can be easily erected at the site, which can be conveniently serviced and which will provide long dependable service at a reasonable cost.

SUMMARY OF THIS INVENTION

This invention provides a Darrieus-type vertical axis wind turbine having a hollow rotor tube extending upwardly from a support structure with two or three rotor blades of troposkein configuration on the rotor tube and a generator which is driven by the rotor tube to produce electrical power. The rotor blades are preferably extruded from an aluminum alloy and are connected to the rotor tube by connectors secured on the leading and trailing edges of each blade at opposite ends thereof and by mini-strut members which attach the connectors to the rotor tube. The rotor tube is secured to the support structure in a lower bearing connection and is secured to a guy wire connection at the top of the turbine through an upper bearing connection. The turbine includes an erection hinge between the support structure and the rotor so the rotor can be assembled at close to ground level and thereafter be hinged to the vertical position. The upper bearing includes an automatic system for lubricating the bearing after the rotor has been hinged to the vertical position. A system is also provided for visually tensioning the guy cables which support the turbine rotor.

An advantage of this invention is that it is adapted to be fabricated in modules at a factory and then transported to an erection site where the turbine can be quickly and easily erected. The turbine includes an automatic oiling system for the upper bearing connection which is inaccessible and has a visual tension setting device for the guy cables so the cables can be easily set and maintained at the proper tension.

This invention also provides a simple, reliable blade to rotor tube connection. The oval airfoil-type blades in a turbine of this invention do not have center struts and are therefore preferably connected to the rotor tube through the skin of the blades. In accordance with this invention, such connection is made through aluminum connectors which are disposed over the leading and trailing edges of the blades on opposite ends thereof and connected to the rotor tube through mini-struts.

The above and other objects and advantages of this invention will be more fully understood and appreciated with reference to the following description and the drawings attached hereto.

DESCRIPTION OF A PREFERRED EMBODIMENT

Figure 2:
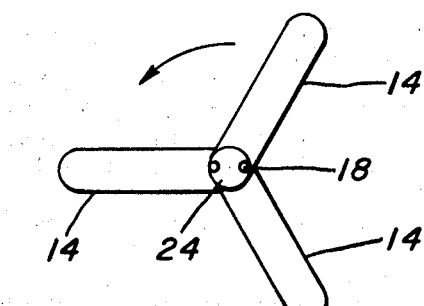
FIG. 2 is a top plan view of the turbine rotor of FIG. 1.
Figure 1:
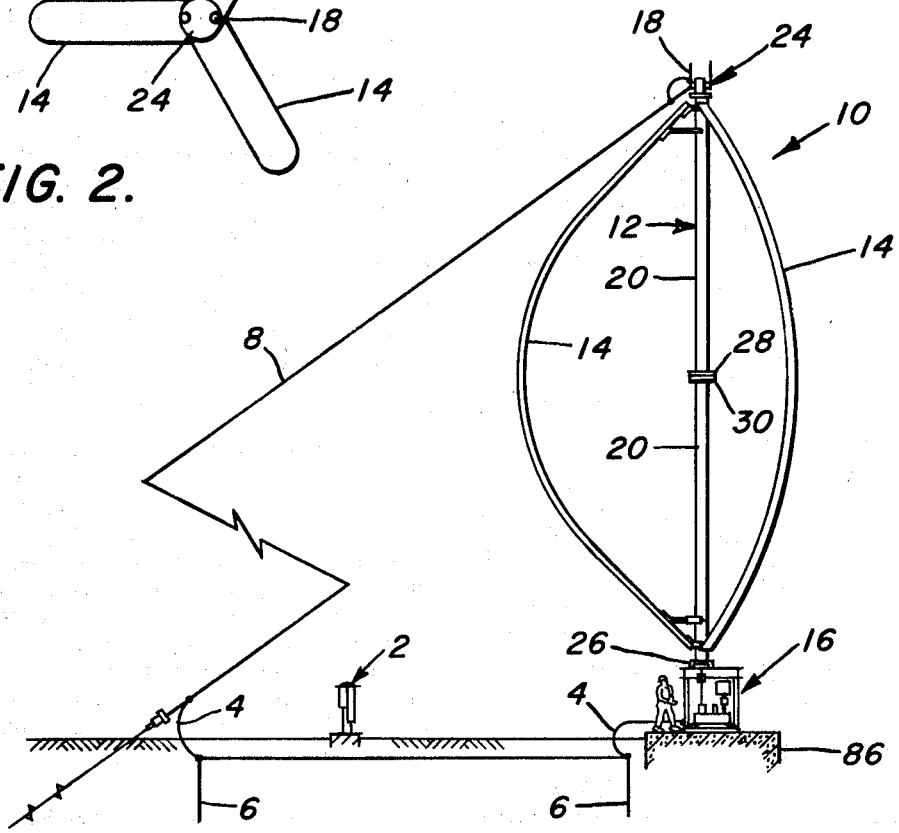
FIG. 1 is a side elevation view of a vertical axis wind turbine of this invention.

Referring to FIGS. 1 and 2, a Darrieus-type vertical axis wind turbine 10 of this invention is illustrated as including a support structure 16 with a power train 16 mounted in it, a tubular rotor shaft 12 with blades 14 on it extending vertically upwardly from the support structure and guy cables 8 supporting the top of the rotor tube. An electrical control panel and enclosure 2 for the turbine 10 are mounted on a concrete pad several feet from the support structure 16 and connected to the turbine by underground cables, not shown. The turbine preferably has three blades 14 to provide optimum power output with minimum cost and minimum torque variation during rotation, but may have only two blades. Lightning points or rods 18 are mounted on the top of the turbine 10 and are connected to the ground through the guy cables 8, rotor tube 12, ground wires 4 and ground rods 6, as will be explained later.

The rotor tube 12 may be a spirally wound hollow steel tube which is secured to guy cables 8 through an upper bearing assembly 24 at the top of the rotor and to the support structure 16 through a lower bearing support 26 at the bottom of the rotor tube. The rotor tube 12 may be a single piece or may comprise a plurality of tube sections 20 with mating flanges 28 and 30 on them for bolting the tube sections together if the length of a single piece causes problems in manufacture and shipping as might occur with long one-piece rotor tubes. The rotor tube 12 in the turbine selected for illustration is 63 feet long and is formed from two tube sections 20. Larger turbines may include three or more tube sections depending on the length of the rotor.

Figure 3:
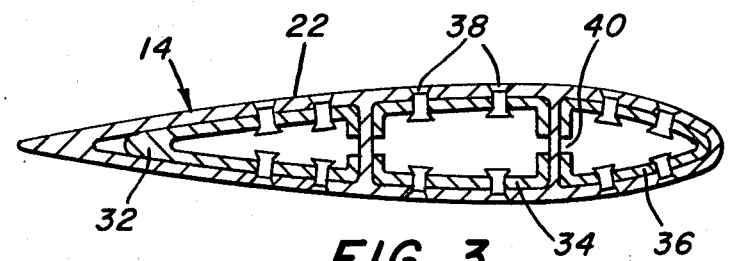
FIG. 3 is a cross section through one of the blades in the turbine at a joint connecting two sections of the blade.
Figure 4:
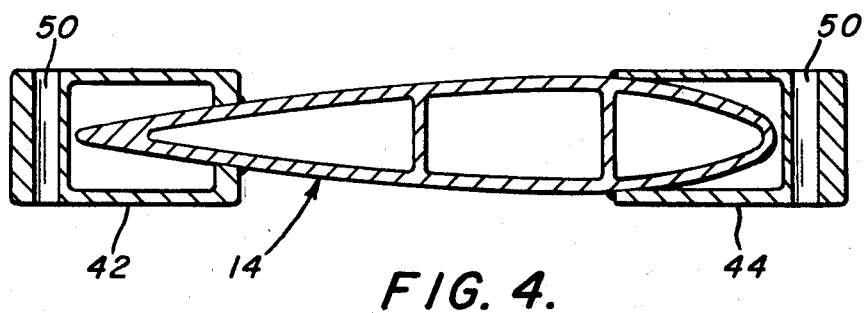
FIG. 4 is a cross section through one of the blades of FIG. 1 at an end connector attaching the blade to the rotor tube.

The rotor blades 14 are preferably formed from hollow aluminum extrusions and have a uniform cross section of airfoil shape (FIGS. 3 and 4). The blades 14 are curved in the form of a troposkein and are attached at opposite ends to the rotor tube 12. Since the blades 14 are not crippled by bending stresses, they can be of light, relatively inexpensive construction which is an important advantage of vertical axis wind turbines. Another cost savings in the blades results from the absence of a twist in the airfoil so the blades are of uniform cross-sectional size from end to end and well suited to being made from aluminum extrusions.

To facilitate forming and shipping of the blades 14, they may be formed by several short sections 22, especially in the case of larger turbines. The number of sections in the blades depends on the size of the turbine, with the one selected for illustration having two sections in each blade. Larger turbines may employ three or four sections in each blade. The joints between sections in the blades are preferably formed by hollow inserts 32, 34 and 36, which are positioned inside the hollow blades. The inserts extend both ways into the abutting ends of the adjoining sections and are preferably riveted to the skin of the blades by rivets 38. The particular rivet used in making the connection is a matter of choice. It is preferably a flush rivet to minimize wind drag and may be a blind or drive type as the application dictates. An epoxy adhesive could also be used in conjunction with the rivets. The hollow inserts 32, 34 and 36 are preferably made from aluminum extrusions which are longitudinally slotted, as for example by a saw cut 40, to permit compression or constriction of the inserts for insertion into the blades 14. The extent of the inserts into the blades is a function of the blade width. To minimize stress at the blade connection points, it has been determined that the extent of the insert into the blade should be 1.0 to 1.3 times the width of the blade. In the turbine selected for illustration, the inserts extend approximately 18 inches into each blade section (36 inches total) to provide support for the joint connection. The blades are preferably shipped in sections to the erection site where the sections are assembled and riveted together.

Figure 6:
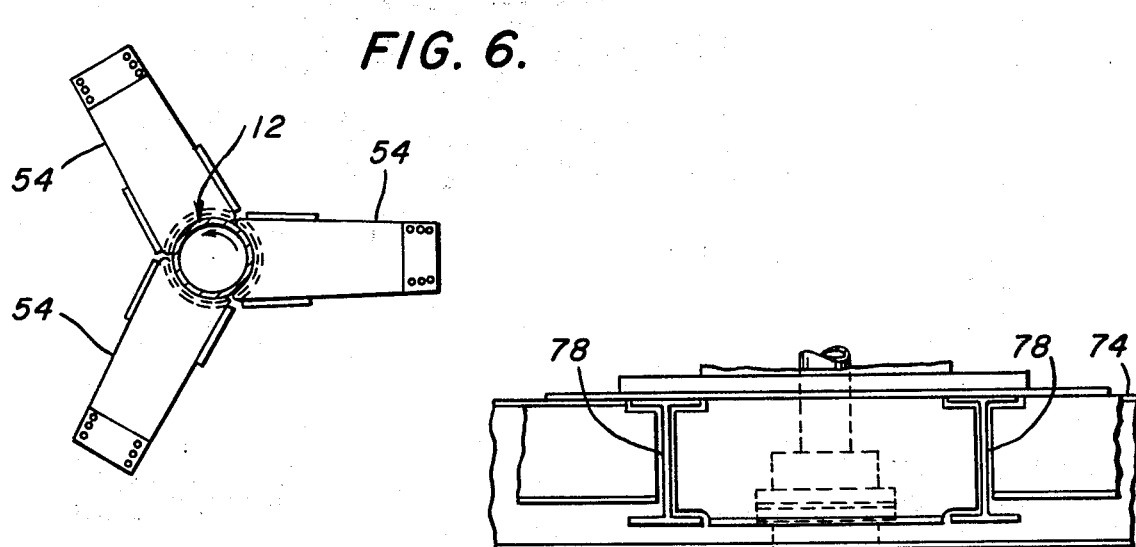
FIG. 6 is a sectional view taken on line VI—VI of FIG. 5 showing the mini-struts extending radially from the rotor tube prior to attachment of the blades.
Figure 5:
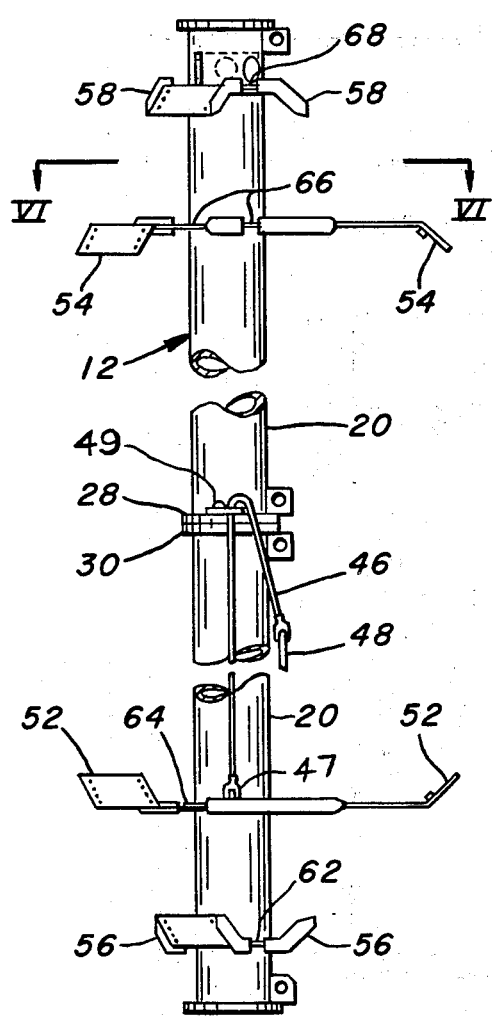
FIG. 5 is a side elevation view of the rotor tube before attachment of the blades to the tube.

FIG. 4 is a cross section through the end of one of the rotor blades 14 showing blade connectors 42 and 44 which are welded on the blade for attaching it to the rotor tube 12 through mini-struts 52 and 54 and end connectors 56 and 58 as shown in FIGS. 5 and 6. The blade connectors 42 and 44 are preferably aluminum extrusions like the blades 14 and are welded to the blades along the exposed corners between the abutting surfaces of the blades and connectors. The blade connectors extend several feet along the end portions of each blade and provide means for connecting the hollow blades to the rotor tube by bolts which are disposed through holes 50 in the connectors and matching holes in the mini-struts and end connectors.

FIGS. 5 and 6 show the mini-struts 52 and 54 and end connectors 56 and 58 mounted on the rotor tubes 12 prior to attachment of the blades. The connectors and mini-struts are essentially the same at the top and bottom ends of the tube 12 and are bolted to attachment rings or flanges 62, 64, 66 and 68 which are welded on the rotor tube. A turbine having three blades 14, as in the embodiment selected for illustration, must have three each of the mini-struts 52 and 54 and end connectors 56 and 58 for attachment of the three blades. The blades 14 are preferably bolted to the mini-struts and end connectors and provide the driving force for rotating the rotor by the influence of wind energy. FIG. 5 also shows a hoisting cable 46 and ring 48 for raising the rotor tube assembly to a vertical position during erection of the turbine as will be described later.

Figures 7, 8:
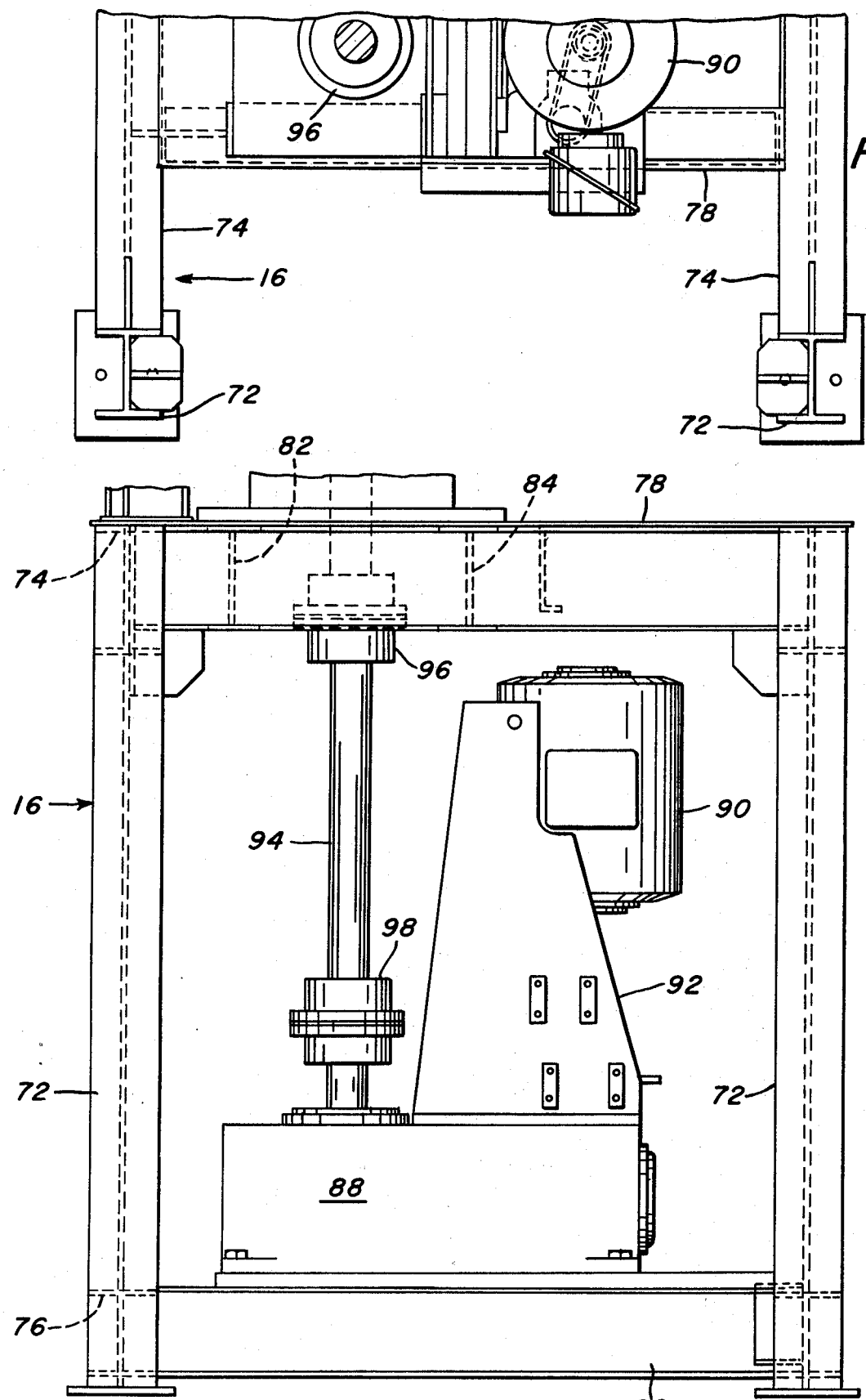
FIG. 7 is a front elevation view showing the support structure and power train for the turbine.
FIG. 8 is a fragmentary top plan view of the support structure and power train of FIG. 7.

The turbine support structure 16 which is shown in FIGS. 7 and 8 is preferably constructed of steel I-beams which are welded together in the form of a short cubical tower. The tower preferably includes four vertical corner posts 72, upper and lower side beams 74 and 76 between the corner posts on two sides of the support structure as viewed in FIG. 7, upper and lower transverse beams 78 and 80 between the side beams, and intermediate cross beams 82 and 84 between the upper transverse beams. The support structure 16 is adapted to be bolted to a concrete pad 86 as is illustrated in FIG. 1 and is preferably enclosed by sheet metal, not shown, to protect the drive train mounted in the structure.

Figure 9:
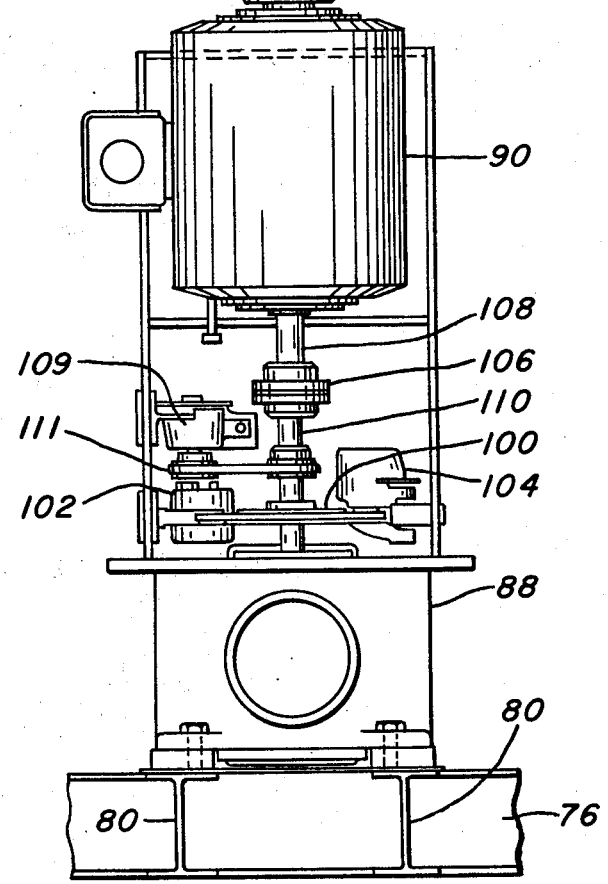
FIG. 9 is a fragmentary side elevation view showing the support assembly and power train for the turbine.

The power train includes a speed increaser 88 which is bolted on the lower transverse beams 80, a generator 90 which is supported on the speed increaser by mounting brackets 92, a low speed drive shaft 94 from the lower bearing connection (FIG. 10) to the speed increaser, drive shaft couplings 96 and 98, and as shown in FIG. 9, a brake disc 100, a service brake 102, an emergency and parking brake 104, a coupling 106 between the generator shaft 108 and the high speed drive shaft 110 coming out of the speed increaser and a tachometer 109 driven by belt 111 off shaft 110. A portion of the drive shaft 94 between the couplings 96 and 98 is removable to provide for tuning the drive system. It is not unusual in operation of machinery having dynamic drive systems that undersirable harmonics develop which can cause resonant vibration within the system which can have an adverse effect upon the system's performance. In the event that such undersirable harmonics should develop in the drive system of this invention, the removable portion of the drive shaft 94 may be replaced with a shaft having a larger or smaller diameter as necessary to eliminate the undesirable harmonics. Control or elimination of undesirable harmonics is not limited to changing the diameter of the drive shaft. It is known, for examle, that providing a section in a drive shaft having resilient characteristics can overcome objectionable harmonics. Thus, shaft 94 could be provided with flanged couplings joined together with bolts extending through grommets made of a resilient material within bolt holes in the coupling flanges. This coupled connection could be made intermediate couplings 96, 98. A preferred embodiment of the invention employs a constant speed variable torque induction generator which varies the load on the rotor to maintain a substantially constant speed of rotation. In the turbine selected for illustration, a 75 HP induction generator may be used which operates at a nominal full load speed of 1825 rpm at 230/240 volts, 3 phase 60 HZ. In such system, the generator is also preferably employed as a motor to start the rotor since frictional resistance or torque in the system will usually prevent self-starting of the rotor, particularly when there is low wind velocity and wind energy. For systems with large generating capacity, over 100 kW for example, it may be desirable to provide an auxiliary starting motor. Using a generator as the starting motor would result in an instantaneous power drain on the field service line which could cause a serious disruption of power to other power users on the line. The nominal rotor speed for the turbine is 64 rpm and the speed increaser has a ratio of 1:51.8 to operate the generator at its rated speed of 1825 rpm.

The brakes 102 and 104 may be pneumatically or hydraulically operated, as for example from a hydraulic pump not shown. The service brake 102 is a double acting brake with two calipers and is adapted to stop the turbine when wind speeds become excessive. The other brake 104 is an emergency and parking brake in which mechanical springs provide the braking action and hydraulic fluid pressure releases the brake. The emergency brake 104 is automatically actuated if there is a loss of power in the turbine.

In this preferred embodiment the braking system acts upon the high speed shaft 110. In other embodiments it may be advantageous to adapt the braking system to act upon the low speed drive shaft 94. For example, braking torque requirements may become very high as the size of the turbine increases, and it may be desirable to brake the unit on the low speed shaft 110 side to avoid imposing an excessive load on the speed increaser 88.

Figure 10:
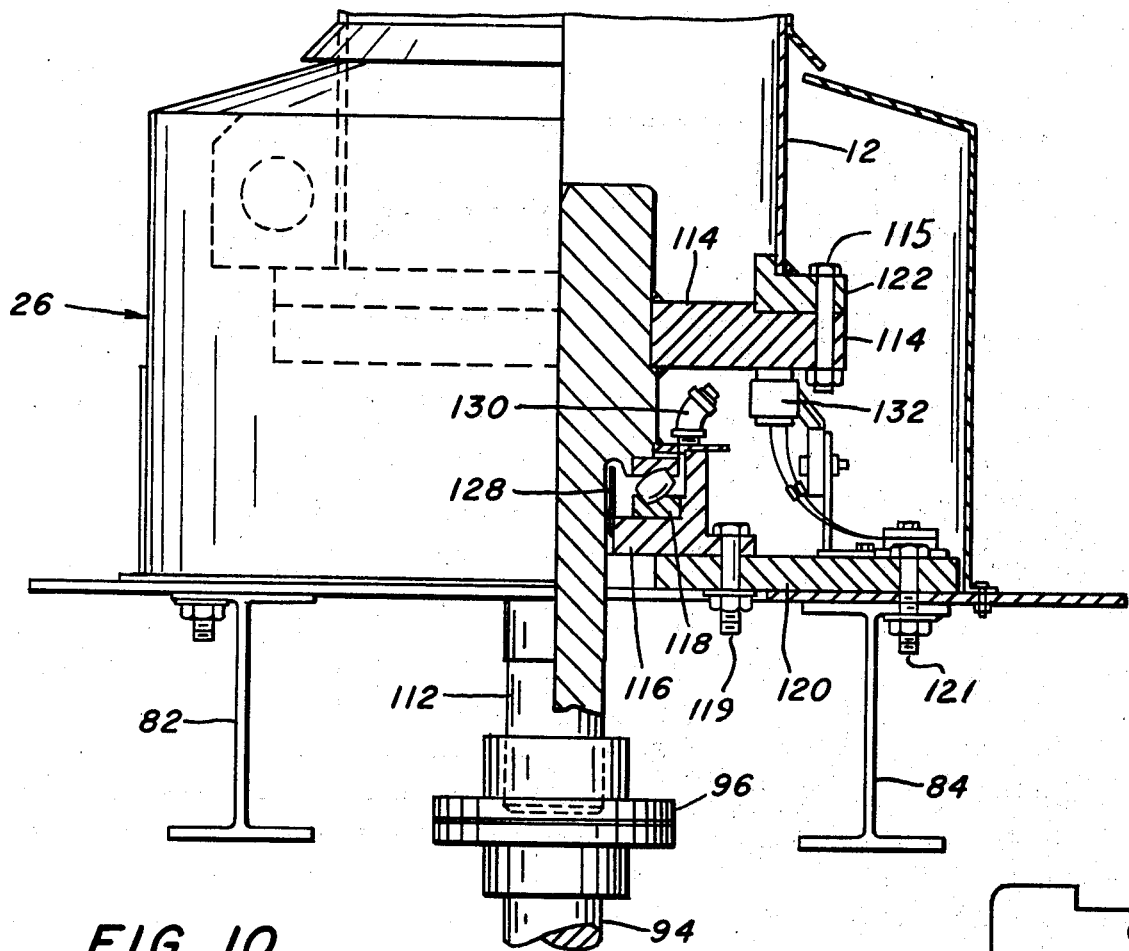
FIG. 10 is a close-up of the bottom end of the rotor tube showing the lower bearing support.

FIG. 10 shows the lower bearing assembly 26 for a turbine of this invention. The lower bearing assembly 26 is supported on and secured to the cross beams 82 and 84 in the support structure 16 and supports the rotor assembly, which weighs approximately 6,800 pounds (3,100 kilograms) in the turbine selected for illustration. In larger turbines, the rotor assembly may weigh over 37,000 pounds or 17,000 kilograms. The lower bearing assembly 26 includes a bearing shaft 112, a disc or flange 114 welded on the shaft, a bearing support 116, and a spherical roller bearing 118. Two C-shaped bearing assembly plates 120 are bolted to the bearing support 116 and secure the bearing assembly on the beams 82 and 84. The plates 120 may be spread apart to permit downward displacement of the bearing for replacement of the bearing without dropping the rotor assembly as will be explained later. The flange 114 is bolted to the bottom end of the rotor tube 12 through a mounting flange 122 which is welded on the bottom end of the rotor tube 12. The bearing shaft 112 is connected to the drive shaft 94 leading to the power train (FIGS. 8 and 9) through the coupling 96. A sleeve 128 between the shaft 112 and the bearing support 116 retains lubricant in the bearing assembly. It may be noted that the sleeve 128 is spaced from the shaft 112 to accommodate lateral movement of the shaft that might occur during operation of the turbine. The lubricant is applied to the bearing through a feed nipple 130 and, as has been previously noted, the lubricant is retained within the bearing assembly by the sleeve 128. The lubricant for the bearings is thus provided and maintained without incorporating oil seals in the bearing assembly. It is advantageous to eliminate the need for oil seals to avoid lubricant leakage and to avoid costly shutdown of the turbine to replace seals as they become inoperative. The lower bearing assembly also includes three electrical brushes 132 for conducting any lightning from the rotor tube to the support structure, which is grounded as seen in FIG. 1, without passing through the bearing 118.

Figure 11:
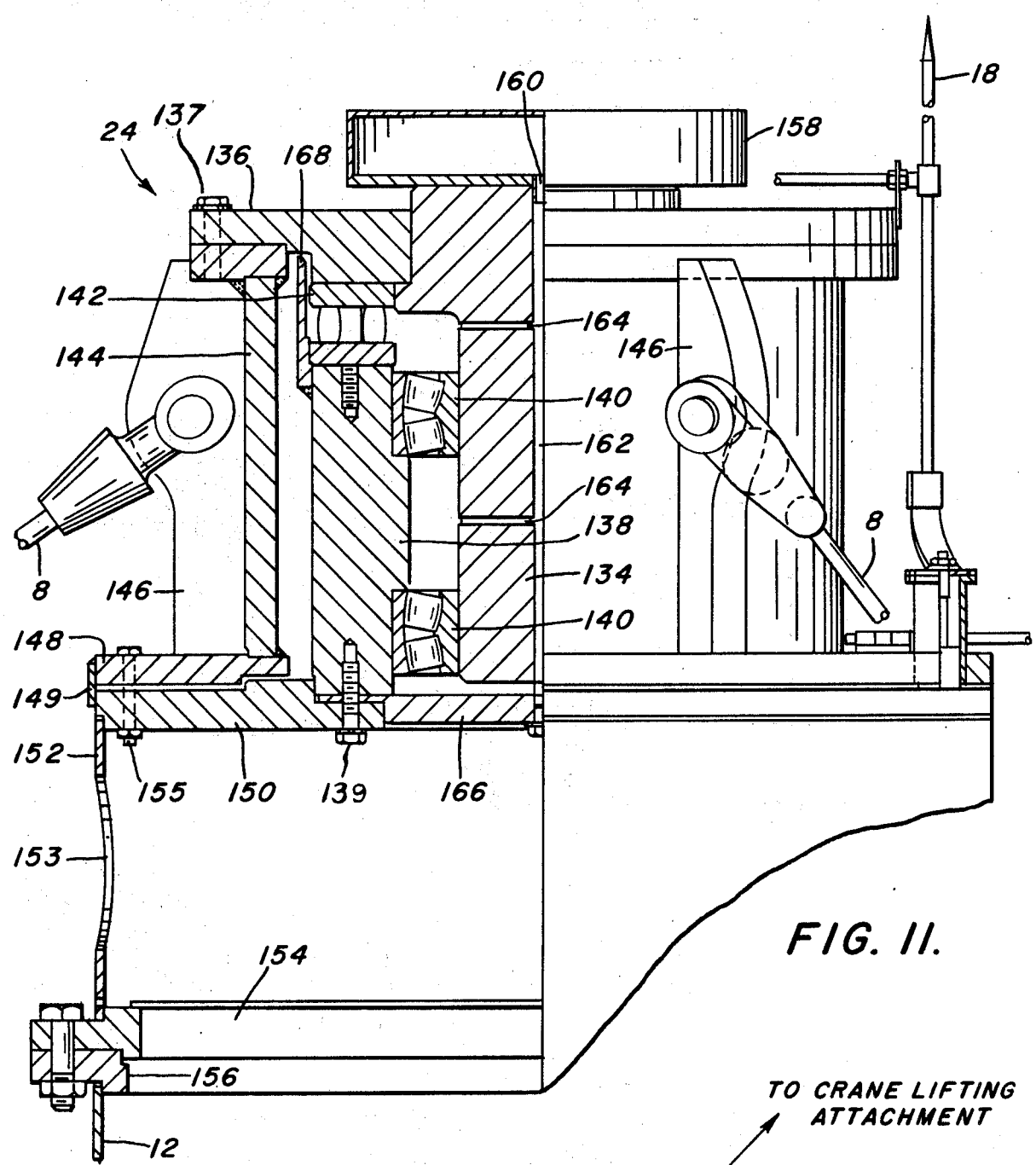
FIG. 11 is a vertical cross section of the upper bearing and guy cable attachment assembly for the turbine of FIG. 1.

The upper bearing and guy cable attachment assembly is shown in FIG. 11 as including a bearing shaft 134 with a mounting flange 136 welded around its top end, an inner cylinder 138 around the shaft, two radial roller bearings 140 between the shaft 134 and the cylinder 138, and a cylindrical roller thrust bearing 142 between the flange 136 and the top of the cylinder 138. Around the inner cylinder 138 is another cylinder 144 to provide a housing for the bearing assembly. Cylinder 144 is bolted to the flange 136 on the bearing shaft. The cylinder 144 has three integral vertical ribs 146 on it equally spaced around its outer face with holes through the ribs for attachment of three or more guy cables 8 to the cylinder 144. A disc 148 is welded around the bottom edge of cylinder 144 to provide additional strength for the cylinder and ribs. The inner cylinder 138 is bolted to a mounting plate 150 which is welded to a connecting sleeve 152 which is in turn welded to mounting ring 154. A sleeve 149 is welded to the disc 148 to provide a protective cover over the space between the disc and mounting plate 150 and thus prevent the entry of foreign matter therein. The mounting ring 154 is bolted to a mounting flange 156 which is welded on the top of the rotor tube 12. Sleeve 152 has holes 153 in it for providing access to bolts 139 and 155 which attach plate 150 to upper bearing assembly 24. Bolts 155 are provided only for shipping purposes and must be removed prior to erection.

It is a feature of this invention that the upper bearing assembly 24 includes means for automatically lubricating the assembly upon erection of the turbine. The lubricating means includes a lubricant reservoir 158 which is sealed on the top of the bearing shaft 134 and which has an opening 160 in it communicating with a bore 162 through the center of the shaft. The reservoir is sealed so no air can get into it except through the opening 160 and the bore 162 in the bearing shaft 134. The bearing shaft further has passageways 164 through it for lubricant to flow from the reservoir into the annular space between the shaft 134 and inner cylinder 138 to lubricate the bearings 140 and 142. A plate 166 seals the bottom of the inner cylinder 138 so the lubricant cannot escape through the bottom of the assembly. An annular collar 168 is welded around the top of the cylinder to a height slightly above the height of the highest passageway 164 in the bearing shaft 134. The level of lubricant in the bearing assembly is limited by the height of the highest passageway 164 since air must enter the reservoir before lubricant can drain from the reservoir. When sufficient lubricant has drained from the reservoir to fill the bearing assembly to above the highest passageway, no more air can enter the reservoir so no more lubricant will drain from the reservoir. Thus, the level of lubricant in the bearing assembly will be properly maintained so long as lubricant remains in the reservoir to replace any that escapes from the bearing assembly.

It may be noted that the upper bearing assembly 24, like the lower bearing assembly 26, is constructed to eliminate the need for oil seals to retain the lubricant in the bearing assembly.

It is also a feature of this invention that the upper bearing assembly can be easily removed from the turbine to replace bearings as may be necessary from time to time. To remove the bearing assembly, a connection is made between disc 148 and mounting plate 150 with bolts 155. This connection fixes the rotor tube 12 in relation to the cylinder housing 144. The bearing shaft 134 is then disconnected from the housing 136 by removing the bolts 137 connecting the flange 136 with the housing 144. The bolts 139 connecting the inner cylinder 138 and the mounting plate 150 are then removed, and thus the bearing assembly can be removed vertically from the mounting to provide access to the bearings.

Figure 13:
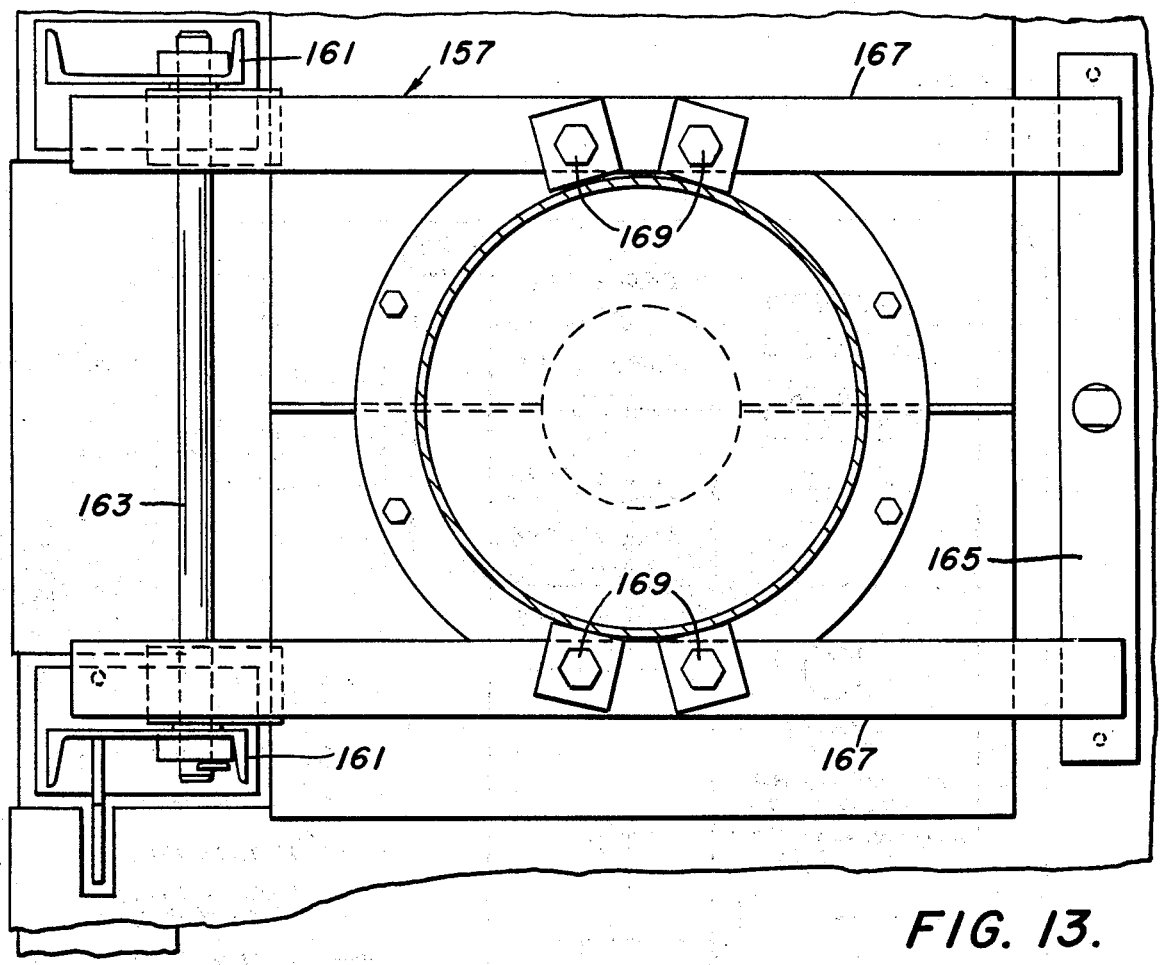
FIG. 13 is a top plan view of the erection hinge of FIG. 12.
Figure 12:
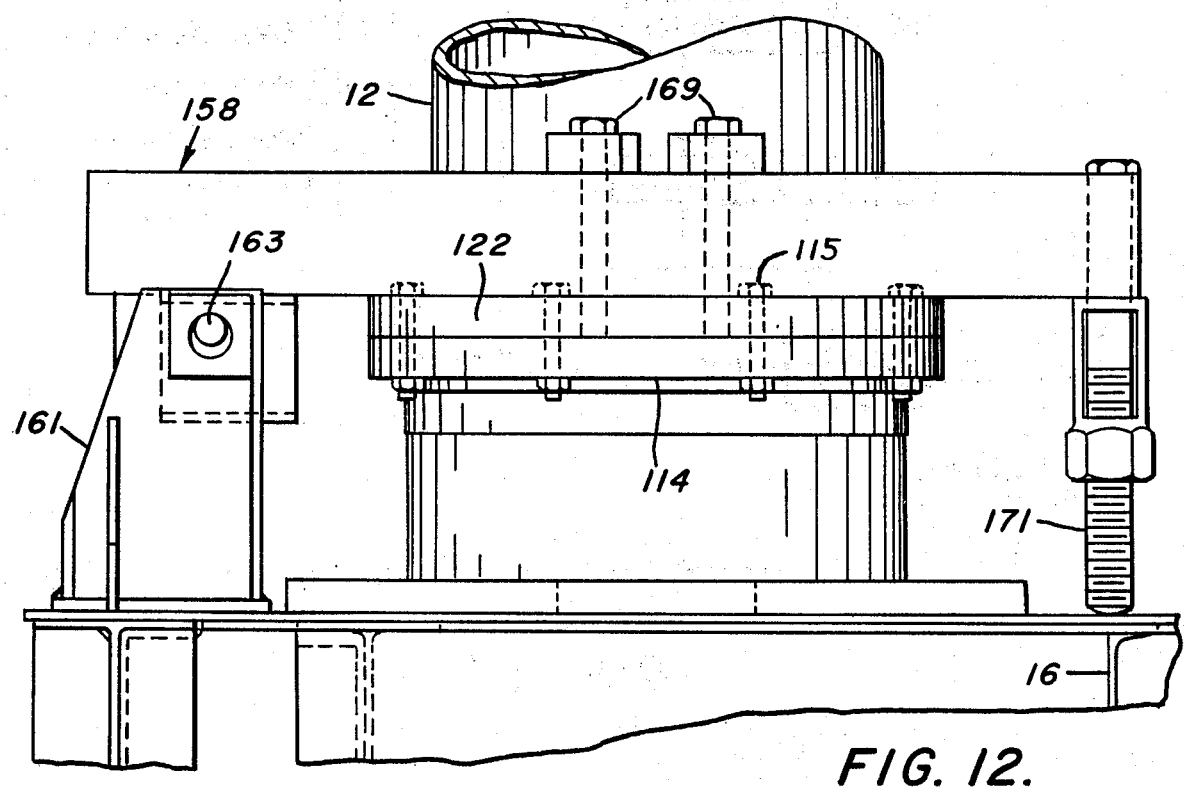
FIG. 12 is a side elevation of an erection hinge for the turbine of FIG. 1.

Another feature of this invention is an erection hinge which permits assembly of the rotor tube 12 and blades 14 in a horizontal disposition of the tube at close to ground level (the top of the support structure 16) followed by hinging of the rotor tube to the vertical position. the erection hinge is also used advantageously in replacing the lower bearing assembly 26 as may be required from time to time. As shown in FIGS. 12 and 13, the erection hinge includes a generally U-shaped frame 157 adapted to be temporarily attached to the mounting flange on the bottom end of the rotor tube 12, two pivot members 161 secured on the top of the support structure 16, and a pivot pin 163 connecting the frame 157 to the pivot members. The frame 157 may be formed by three beams 167, 167 and 165 welded together in the shape of a U and preferably has adjustable supporting legs 171 at the two corners opposite the pivot members 161 to support the frame on the supporting structure 16 as seen in FIG. 12. The side beams 167 in the frame 157 have holes in them which may be aligned with holes in the attachment flange 122 on the rotor tube 12 for receiving connecting machine bolts 169.

Figure 14:
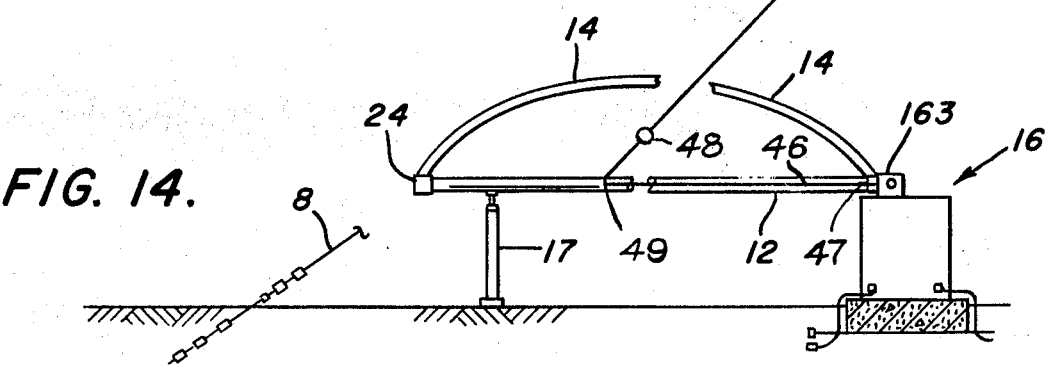
FIG. 14 shows a turbine of this invention during assembly with the rotor tube horizontal and connected to the support structure through the erection hinge of FIG. 12.

In assembly of a turbine of this invention, the sections 20 of rotor tube 121 are bolted together and supported in a horizontal position on jack 17 and support structure 16 as seen in FIG. 14. The erection hinge is bolted to the top of flange 122 on the bottom end of the tube 12 and pivotably pinned to the support structure 16. The rotor blades 14 are then attached to the rotor tube 12, and the upper bearing and guy cable attachment assembly 24 is bolted on the top of the rotor tube. The cables 8 are attached to the attachment assembly 24 and to their anchors but are left slack to permit raising of the rotor assembly. With a turbine having three blades 14, the blades are spaced 120° apart and project from the rotor tube further than the height of the support structure 16 so accommodation must be made for such projection when the blades are attached to the rotor tube.

Preferably, the rotor tube is disposed so that one of the upper end connectors 58 and a lower end connector 56 are projecting vertically upward from the horizontal tube. One of the rotor blades is then hoisted into place and firmly bolted to the end connectors and mini-struts. End connectors and mini-struts are then attached to the remaining two rotor blades which are hingably connected to the rotor tube by making a loose bolt connection between the rotor tube attachment rings and the end connectors and the mini-struts.

The rotor tube is then pivoted upward about its end hinge connection, and in so doing, the rotor blades pivot about their respective loose end connections. When the rotor tube is pivoted a sufficient distance that the remaining bolt holes in the attachment rings are aligned with their respective matching holes in the end connectors and mini-struts, the tube is maintained in that position and the bolted connections are firmly made.

It is apparent that the remaining rotor blades could be attached to the rotor tube after the tube with one blade attached has been pivoted upward a sufficient distance that blade and tube connections can be made without interfering with the ground surface. This upward pivoting can be done with the same crane which is used to pivot the rotor tube to the upright position. Alternatively, trenches may be dug along both sides of the rotor tube for receiving the blades with no elevation of the rotor tube.

Once the blades 14 and upper bearing and guy cable assembly 124 are mounted on the rotor tube, the crane lifts the rotor tube assembly as shown in FIG. 14 so it pivots about its hinge connection to the support structure. Once the rotor tube reaches the vertical position, the guy cables 8 are tightened and the bolts 169 securing the erection hinge to the rotor tube are removed so the attachment flange 122 can be bolted with bolts 115 to flange 114 of th lower bearing assembly 26 as seen in FIG. 10. The erection hinge may then be removed from the support structure by removing pivot pin 163. The guy cables 8 are then ready to have the proper tension applied to them. Since the cables 8 may stretch and the anchors may give slightly when tension is first applied, the tension in the guy cables is preferably applied gradually and checked frequently during at least the first few days after erection of the turbine.

It is a novel feature of this invention that hoisting cables 46 are provided to enable pivoting and raising the rotor to its upright position with a crane without the need of making a disconnection from the crane at a relatively high elevation above ground after the rotor is in an upright position.

Referring to FIG. 5, the bottom end of a first hoisting cable 46 is attached to the lower mini-strut flange 64 with a clevis 47. The cable 46 extends upward along the tube through a hoisting plate 49 which is preferably located at any point along the tube from the midpoint of the tube to its upper end and in this preferred embodiment is attached to the bottom flange 28 of the upper rotor tube section. If the rotor tube is a single piece, the plate 49 may be attached directly to the tube. The opening in the plate 49 is of sufficient size to permit the clevis 47 to pass therethrough. A ring 48 is provided on the upper end of the cable 46 for attachment to the crane. A second hoisting cable, clevis and hoisting plate (not shown) are provided axially disposed on the tube along a line spaced approximately 180° from the first hoisting cable. Thus, a hoisting cable is provided along lines on either side of a single rotor blade 14. Referring now to FIG. 14, with the rotor tube 12 in a horizontal position preparatory to pivoting and erecting, the rings 48 are attached to spaced apart hooks on a connecting bridle attached to the crane cable. The connecting bridle is adapted to maintain the bridle cables spaced away from one another so as to not contact the rotor blade 14 therebetween, and such bridles are known to those skilled in the art.

It may be seen that all of the aforesaid connections may be made at essentially ground level. The crane is then operated to raise the rotor to its upright position and the rotor tube is bolted to the lower bearing assembly as has previously been described. To disconnect the crane from the rotor, clevises 47 are simply disconnected from the lower mini-strut ring 64 and the hoisting cables 46 are then pulled through the hoisting plates 49. Thus, after hoisting the rotor into its upright position, the rotor can be safely and quickly disconnected from the crane at an essentially ground level position.

Figure 15:
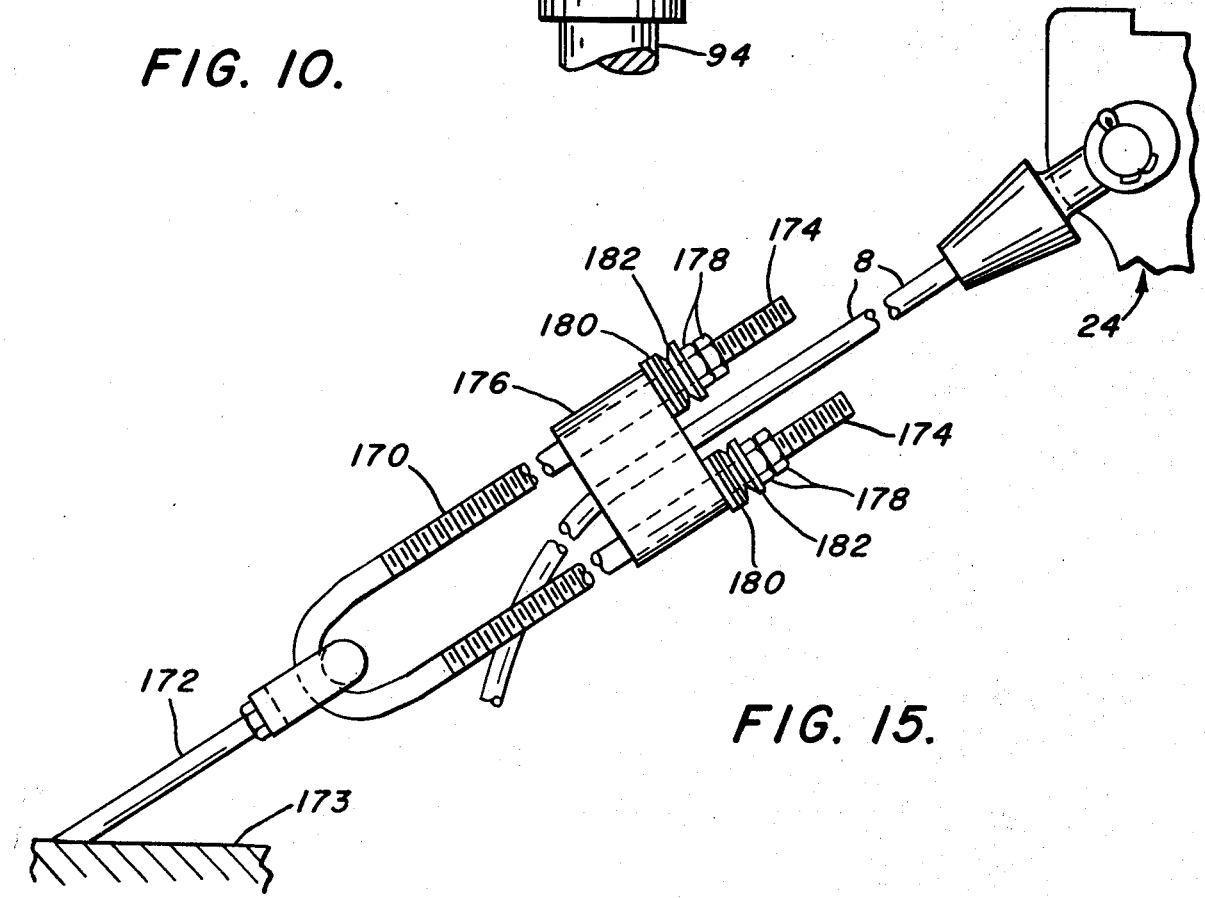
FIG. 15 shows the guy cable tension indicating apparatus for the turbine of FIG. 1.

To simplify adjustment of the tension in the guy cables 8, this invention provides improved apparatus for applying and indicating the proper tension. FIG. 15 shows such apparatus as including a U-shaped clevis 170 connected to an anchor rod 172 and a concrete anchor 173. The ends 174 of clevis 170 are threaded and a cable attachment member 176 is positioned on the clevis. Nuts 178 hold the cable attachment member 176 on the clevis and provide for adjustment of the tension in the cable 8. In accordance with this invention, Belleville type washers 180 and 182 are disposed on the clevis between the cable attachment member 176 and the nuts 178. A preferred embodiment of the invention has four such washers on each end of the clevis, with two washers 180 on each end provided to flatten at one-half the desired tension in the cable and the other two washers 182 on each end provided to flatten at a force slightly greater than one-half the desired tension in the cable. By a force slightly greater is meant a force 5–10% greater than one-half the desired tension in the cable. FIG. 15 shows a cable 8 after proper tensioning with two of the washers 180 on each end of the clevis in the flat condition and the other two washers 182 on each end of the clevis in the concavo-convex shape. The spring's resistance to flattening is established by one-half the desired tension in the cable since each end of the clevis bears one-half the load of the guy cable 8. If the washers 180 which are provided to flatten at one-half the desired cable tension are in the concavo-convex condition, the tension in the cable is less than desired. Conversely, if the washers 182 which are provided to flatten under loads slightly greater than one-half the desired cable tension are flat, the tension in the cable 8 is greater than desired. Thus, the Belleville washers provide visual means for easily setting and indicating the desired tension in the guy cables 8. Although four washers are provided on each end of the clevis in the preferred embodiment of this invention, only two washers are required.

As has been mentioned previously, the lower bearing assembly 26 may be replaced should the need arise without lowering the rotor shaft 12. Referring first to FIGS. 12 and 13, the generally U-shaped frame 157 is positioned in relation to the shaft 12 with beams 167 resting upon rotor tube attachment flange 122 and the frame 157 is then connected to pivot members 161 with pivot pin 163. Bolts 169 are then used to connect beams 167 to the rotor tube attachment flange 122. The supporting legs 171 are then adjusted so that the legs bear firmly against the support structure 16.

Now referring to FIGS. 7 and 10, couplings 96 and 98 are disconnected and shaft 94 is removed. Bolts 119 and bolts 121 are removed and C-shaped bearing plates 120 are then spread apart a distance sufficient to enable the bearing assembly 26 to be removed in a downward vertical direction. While providing temporary support for the bearing assembly 26, the bearing shaft flange 114 is disconnected from the rotor shaft flange 122 by removing bolts 115. The temporary support can then be removed permitting the bearing assembly 26 to drop vertically downward.

Figure 16:
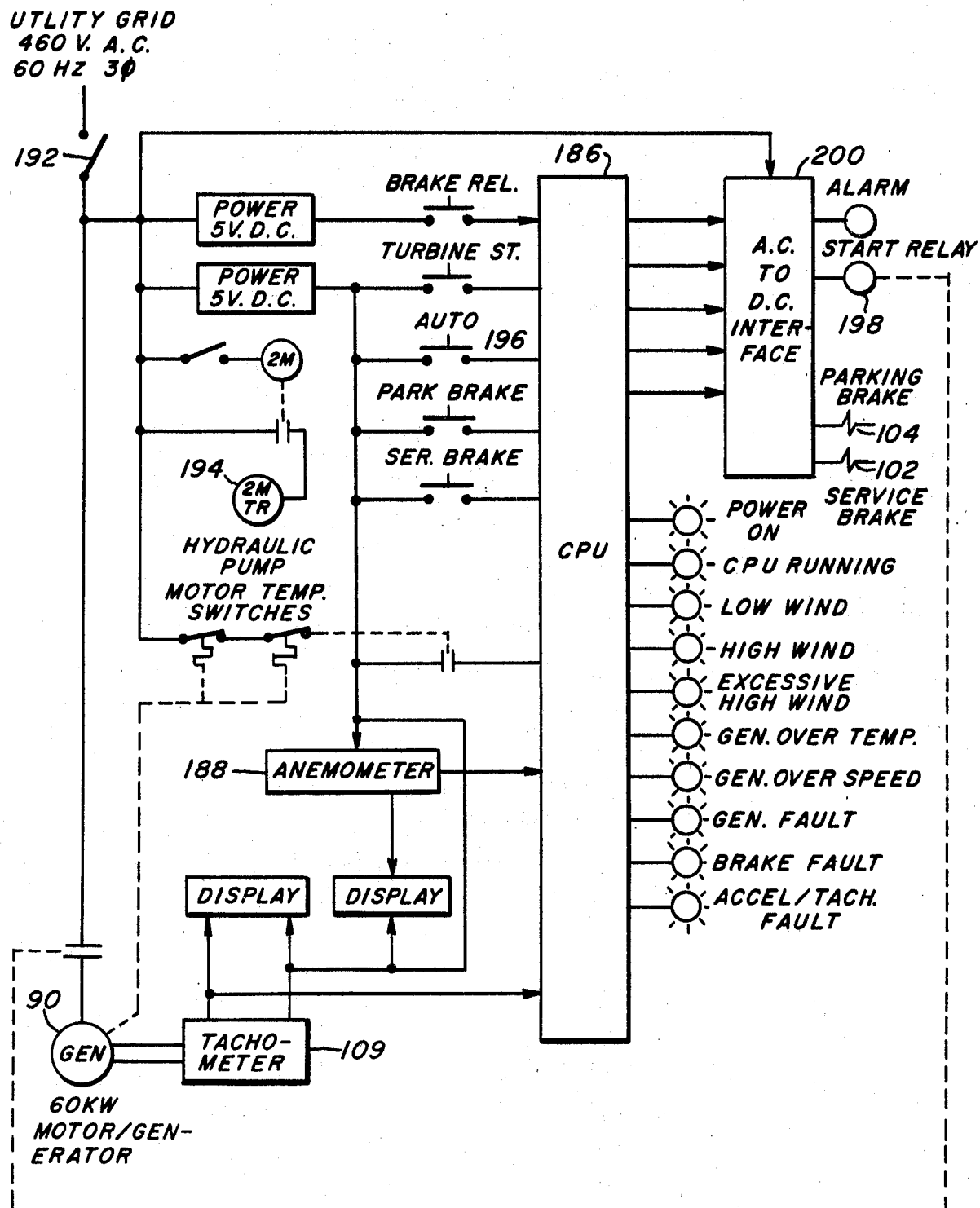
FIG. 16 is an electrical control line diagram for a turbine of this invention.

FIG. 16 is an electrical control line diagram for a wind turbine of this invention. As diagramed, the generator 90 in the turbine is adapted to be connected into a field power connection or utility grid for power input for operation of the generator as a motor to start the turbine and also for feeding surplus power output from the generator to the field power. Arrangements would be made with the utility company which owns and operates the field power for credit to the turbine based on the power supplied to the field power. Tying into a field power in this way obviates any need for a storage means such as a battery for storing power generated by the turbine.

The heart of the control system is a microprocessor 186 that serves as the central processing unit (CPU) for the system. The CPU receives signals from the anemometer 188, tachometer 109 and temperature sensors, not shown, to operate the unit automatically. Manual switches are also provided for starting the turbine and setting the brakes as may be desired for testing the unit. Visual displays are provided for visual readings of wind and generator speeds and lights are provided for signaling various functions and malfunctions. The CPU is operated at 5 volts DC while the field service and generator are at 460 volts AC. Accordingly, the system includes power transformers and an AC to DC Interface 200 to accommodate this difference.

In operation, the main power switch 192 is closed to feed power to the system, the hydraulic motor pump 194 is switched on to provide pressure for the brakes, and switch 196 is closed for automatic operation of the system. The CPU 186 will operate the starter relay 198 to start the generator if the wind speed is greater than 10 mph and will release the parking brake 104. Once the generator 90 gets the turbine up to speed, the wind will drive the turbine and will produce electrical power which will either be used locally or fed into the utility grid. The turbine rotates at a constant speed of 64 rpm as controlled by the variable torque generator which requlates the load on the turbine.

If the wind speed increases to above approximately 50 mph, which could damage the turbine, the CPU 186 automatically operates the service brake 102 to stop the turbine and shuts off the generator. The parking brake 104 is then set to prevent rotation of the turbine. The CPU also automatically shuts the turbine down if the wind slows to less than approximately 8 mph or in the event of malfunctions such as generator overheating, brake faults or excessive generator speeds.

In the fabrication and erection of a wind turbine of this invention, the support tower 16 is assembled in the factory as a module including the lower bearing assemblies 26, the drive shaft 94, couplings 96 and 98, the speed increaser 88, brakes 102, 104 and generator 90 for shipment as a module. Other shipping modules include (1) the rotor tube sections 20, (2) top bearing and guy cable assembly 24, (3) mini-struts and end connectors, (4) the blade sections 22 with the connectors for each section, (5) guy cables and tension setting devices, (6) electrical controls and components and (7) auxiliary components such as lightning rods, anemometers and control enclosures. The modules are shipped to an erection site which has been prepared for the turbine, and the turbine is quickly erected at minimum cost by relatively unskilled labor. There is preferably no welding at the erection site. The rotor tube sections 20 are bolted together at the site and attached to the support tower 16 by the erection hinge. The blades 14 are assembled and bolted on the rotor tube followed by raising the rotor assembly with a crane and bolting the rotor to the lower bearing support assembly. The erection hinge may then be removed and the guy cables connected and the proper tension applied to them. The controls are next connected and the turbine is ready to operate.

Turbines of this invention may be of various sizes and have various generating capacities. The turbine selected for illustration has a rotor which is 63 feet high and 42 feet in diameter and a generator capacity of 60 kW. Other projected sizes and capacities include 45 feet high by 30 feet in diameter and 22 kW capacity, 83 feet high by 55 feet in diameter and 112 kW capacity and 123 feet high by 82 feet in diameter and generating capacity of 300 kW or 500 kW. Depending on the size of the turbine and wind energy available to operate the turbine, turbines of this invention are expected to produce electricity at costs in a range of $0.02 to $0.08 per kWh based on 1979 construction costs. As would be expected, the larger turbines will produce electricity at the lowest cost.

It is seen that an improved Darrieus-type vertical axis wind turbine is herein illustrated and described which can be fabricated at the factory in modules for shipment to an erection site. The turbine has an improved rotor tube construction and bearing arrangement for support of the rotor tube. The invention also provides an erection hinge for simplifying assembly of the turbine, an automatic oiling system for the upper bearing assembly, means for easily adjusting and maintaining the proper cable tension, and an improved system for connecting the blades to the rotor tube. Although a preferred embodiment of the invention has been selected for illustration and description, it will be apparent that numerous modifications can be made therein without departing from the invention or the scope of the claims attachd hereto.

What is claimed is:

1. A vertical axis wind turbine, comprising:
   a support structure;
   a rotor shaft extending vertically upward from said structure;
   a lower bearing supporting said rotor shaft in said support structure;
   an upper bearing assembly adapted for disassembly from said turbine with said rotor shaft in the upwardly extending vertical position, the assembly comprising a housing having a top wall and having cable attaching means for attachment to guy cables to thereby maintain the housing in a substantially fixed position, an upstanding cylinder adapted for attachment to a top end of said rotor shaft within and spaced apart from the housing, bearing means between the cylinder and housing to maintain the cylinder in the spaced apart relationship with the housing and to allow the cylinder to rotate about its longitudinal axis, and lubrication means to automatically provide and maintain an adequate amount of oil to lubricate the bearing means;
   at least three guy cables attached to the cable attaching means;
   wind responsive means for causing said shaft to rotate in response to wind energy; and
   a generator connected to said rotor shaft for producing electrical energy upon rotation of the turbine shaft by wind energy.

2. A turbine as set forth in claim 1 wherein said upper bearing assembly further comprises:
   a central bearing shaft depending from the top wall of the housing;
   the upstanding cylinder being hollow and having the central bearing shaft extending into the cylinder in a spaced apart relationship therewith;
   bearing means between the cylinder and the shaft to maintain the spaced apart relationship and allow the cylinder to rotate about its longitudinal axis.

3. A vertical axis wind turbine, comprising:
   a support structure;
   a rotor shaft extending vertically upward from said structure;
   a lower bearing supporting said rotor shaft in said support structure;
   an upper bearing assembly having means for attaching guy cables thereto on a top end of said shaft;
   at least three guy cables attached to the cable attaching means;
   guy cable tension indicating apparatus for indicating the tension in each cable when attached to an anchor comprising a second cable attaching means for attachment to at least one anchored threaded rod, at least one nut on each threaded rod for adjusting the position of the second cable attaching means, and at least two Belleville type washers having predetermined flattening characteristics on each rod between a nut and the second cable attaching means for providing a visual indication of the tension in each guy cable;

wind responsive means for causing said shaft to rotate in response to wind energy; and a generator connected to said rotor shaft for producing electrical energy upon rotation of the turbine by wind energy.

4. A vertical axis wind turbine as set forth in claim 3 in which said tension indicating apparatus comprises an adjustable dead end connector attaching a guy cable to an anchor, said dead end connector including a U-shaped clevis with threaded ends, a cable attaching means on the clevis, nuts on the clevis for adjusting the position of the cable attaching means, and at least two Belleville type washers having predetermined flattening characteristics on each end of the clevis between the nuts and the cable attaching means for providing a visual indication of the tension in the guy cable.

5. A wind turbine as set forth in claim 4 in which said tension indicating apparatus includes at least two Belleville type washers on each end of the clevis with one washer having a resistance to flattening from a force one-half the desired tension in the cable and the other having a resistance to flattening from a force slightly greater than one-half the desired tension in the cable.

6. A wind turbine as set forth in claims 1 or 3 which further includes a hinged connection between said rotor shaft and said support structure to enable assembly of the upper bearing assembly and wind responsive means with the rotor shaft in a substantially horizontal position, and then raising the rotor shaft assembly to its vertical position.

7. A vertical axis wind turbine, comprising:
a support structure;
hinge means attached to said support structure;
a lower bearing within said support structure;
a rotor shaft having a top end and bottom end with the bottom end adapted for assembly with said hinge means to enable positioning said shaft in a horizontal or vertical position and with the bottom end further adapted for disassembly from said hinge means and attachment to said lower bearing with said shaft in the vertical position;
an upper bearing assembly having means for attaching guy cables thereon on the top end of said shaft;
wind responsive means for causing said shaft to rotote in response to wind energy; and
a generator connected to said lower bearing for producing electrical energy upon rotation of the shaft by wind energy.

8. A wind turbine as set forth in claim 7 wherein said hinge means comprises pivot members mounted on said support structure; a pivot pin rotatably connected to said pivot members; and means for connecting said pivot pin to said rotor shaft from a horizontal position to a vertical position.

9. A wind turbine as described in claims 3 or 7 wherein said upper bearing assembly is adapted for disassembly from said turbine with said rotor shaft in the upwardly extending vertical position.

10. A wind turbine as described in claims 1 or 7 wherein said guy cable tension indicating apparatus is attached to an anchor comprising a second cable attaching means for attachment to at least one anchored threaded rod, at least one nut on each threaded rod for adjusting the position of the second cable attaching means, and at least two Belleville type washers having a predetermined resistance to flattening on each rod between a nut and the second cable attaching means for providing a visual indication of the tension in each guy cable.

11. A wind turbine as described in claims 1, 4 or 7 wherein said wind responsive means comprises at least two rotor blades of troposkein configuration with one end of each blade attached near the top of the rotor shaft and the other end of each blade attached near the bottom of the rotor shaft.

12. A wind turbine as set forth in claims 1 or 7 which further includes a removable shaft portion in the connection between the rotor shaft and the generator to provide means for tuning the drive system.

13. A method of assembling and erecting a vertical axis wind turbine, comprising:
providing a support structure;
hingably connecting a rotor shaft to said support structure with said shaft in a substantially horizontal position;
hoisting said rotor shaft into a vertical position above said support structure;
connecting said rotor shaft to a generator within said support structure; and
disconnecting said hinge connection between said support structure and said rotor shaft.

14. A method of assembling and erecting a wind turbine as described in claim 13 which further includes attaching an upper bearing assembly having a cable attachment means thereon on the top end of the rotor shaft, attaching two or more rotor blades having a troposkein configuration to the rotor shaft by attaching one end of each blade near the top of the rotor shaft and attaching the other end of each blade near the bottom of the rotor shaft, and attaching at least three guy cables to the cable attaching means while said rotor shaft is in a substantially horizontal position.

15. A method of assembling and erecting a wind turbine as described in claim 13 which further includes providing means for disconnecting said rotor shaft from hoisting means at substantially ground level after said rotor shaft is hoisted into a vertical position above said support structure.

16. A turbine as claimed in claim 1 wherein said upper bearing assembly further includes a reservoir having oil sealed therein disposed above said bearing means and having an opening in the reservoir to permit a flow of oil therefrom by gravity.

17. A turbine as set forth in claim 16 wherein said upper bearing assembly further includes:
the upstanding cylinder having a cylindrical side wall defining an opening extending inwardly from the top of the cylinder;
a central bearing shaft depending from the top wall of the housing into the cylinder opening in a spaced away relationship with the cylinder side wall;
bearing means between the cylinder side wall and the bearing shaft to maintain the spaced away relationship between the side wall and the shaft and to allow the cylinder to rotate about its longitudinal axis; and
the lubrication means is a central bore in the shaft having its upper end connected to the reservoir opening and at least one passageway extending radially from the central bore to the exterior of the shaft, the passageway disposed in a horizontal plane passing through at least a portion of the bearing means between the housing and the cylinder, and the lubrication means further includes a top portion of the cylinder side wall extending above the plane passing through at least a portion of the bearing means between the housing and the cylinder to maintain an oil bath within the cylinder sufficient to provide oil to the bearing means between the cylinder and the housing and the bearing means between the cylinder and the bearing shaft.

* * * * *